(12) United States Patent
Chan

(10) Patent No.: US 6,865,227 B2
(45) Date of Patent: Mar. 8, 2005

(54) ERROR CONCEALMENT OF VIDEO DATA USING MOTION VECTOR DATA RECOVERY

(75) Inventor: Joseph C. Chan, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 784 days.

(21) Appl. No.: 09/903,212

(22) Filed: Jul. 10, 2001

(65) Prior Publication Data

US 2003/0012280 A1 Jan. 16, 2003

(51) Int. Cl.[7] .............................................. H04N 7/12
(52) U.S. Cl. ............ 375/240.16; 375/240; 375/240.01; 375/240.12; 375/240.27
(58) Field of Search ..................... 375/240.16, 240.27, 375/240.12, 240, 240.01; 382/239

(56) References Cited

U.S. PATENT DOCUMENTS 5,974,185 A * 10/1999 Boyce et al. ................ 382/239
6,052,414 A * 4/2000 Lee et al. ............... 375/240.16

* cited by examiner

*Primary Examiner*—Allen Wong
(74) *Attorney, Agent, or Firm*—Blakely, Sokoloff, Taylor & Zafman LLP

(57) ABSTRACT

A method for concealing errors in video data is disclosed. The method includes decoding a first set of motion vectors and estimating a second set of remaining motion vectors in the corrupted video packet. A motion compensated temporal replacement of texture data is performed using the first and second sets of motion vectors. The image smoothness of the texture data is then performed. The decoding, estimating, performing temporal replacement, and evaluating are repeated with one less motion vector in the first set and one more motion vector in the second set. The repeating is done until there is no more motion vector left in the first set. Sets of motion vectors that produce a best image smoothness measure of the texture data are selected from the first and second sets.

33 Claims, 7 Drawing Sheets

ERROR CONCEALMENT OF VIDEO DATA USING MOTION VECTOR DATA RECOVERY

BACKGROUND

The present invention relates to concealing errors in video data, and more particularly, to using motion vector data recovery for such concealment of errors.

In an MPEG-4 decoder used for real-time streaming, when an error is detected in the motion partition of a video packet, substantially all decoded information of that packet is often discarded. The region of the video frame corresponding to this corrupted packet may then be generated by error correction process. However, traditional error detection and correction systems, such as interleaving, may require a significant amount of overhead as well as significant amount of data processing when decoding coded video bit stream signals. Thus, current video decoding systems may rely on error concealment techniques for effective video streaming. In contrast to error correction, which attempts to reconstruct lost or corrupt data, error concealment aims to generate data that may be substituted for the lost or corrupt data. Discrepancies in image created by the generated data (generally at the macroblock level) are not likely to be perceived by a viewer of a video image that utilizes such error concealment.

Motion compensated temporal replacement may be an appropriate error concealment technique in video frames without much scene changes. This technique uses motion information to propagate macroblocks from the previous frame to replace the corrupted macroblocks in the current frame. Thus, this technique may provide effective error concealment as long as motion information can be obtained without much error.

One approach in obtaining the motion information is to use average or median of motion vectors from neighboring uncorrupted macroblocks. This technique is simple but sometimes yields inadequate performance when the actual motion vector of neighboring macroblocks differs. Another approach may involve use of motion estimation in the decoder. This approach may yield better visual results than averaging neighboring motion vectors but may require significantly more processing time.

SUMMARY

In one aspect, a method for concealing errors in video data is disclosed. The method includes decoding a first set of motion vectors and estimating a second set of remaining motion vectors in the corrupted video packet. A motion compensated temporal replacement of texture data is performed using the first and second sets of motion vectors. The image smoothness of the texture data is then performed. The decoding, estimating, performing temporal replacement, and evaluating are repeated with one less motion vector in the first set and one more motion vector in the second set. The repeating is done until there is no more motion vector left in the first set. Sets of motion vectors that produce a best image smoothness measure of the texture data are selected from the first and second sets.

In another aspect, an error concealment system is described. The system includes an error location detector, a motion vector estimator, a motion compensated temporal replacement element, an image smoothness evaluator, and a best smoothness selector.

The error location detector determines location of video packet error. The motion vector estimator estimates motion vectors. The motion compensated temporal replacement element is arranged to receive decoded motion vectors and estimated motion vectors. The replacement element performs motion compensated temporal replacement of texture data using the decoded and estimated motion vectors. The image smoothness evaluator evaluates smoothness of a series of replaced texture data. The best smoothness selector then selects a set of motion vector that produces best image smoothness.

DETAILED DESCRIPTION

In recognition of the above-stated difficulties with the prior error concealment techniques, the present invention describes embodiments for error concealment of video data using motion vector data recovery. In a further embodiment, the motion vector data recovery process may be bi-directional. Thus in concealing video packets with corrupted motion partition, the decoder attempts to utilize uncorrupted received motion information. Although present embodiments are applicable to any video data, they are particularly well suited for MPEG-4 decoders used for real-time streaming video. Consequently for purposes of illustration and not for purposes of limitation, the exemplary embodiments of the invention are described in a manner consistent with such use, though clearly the invention is not so limited.

Embodiments are described below for estimating the motion vectors of corrupted macroblocks by averaging motion vectors of uncorrupted neighboring macroblocks. In these embodiments, a candidate motion vector set may be created by combining the decoded motion vectors up to a particular point (e.g. $K_{init}$=macroblock location of the detected error) and the estimated motion vectors after that point. This candidate motion vector set may then be used to perform motion compensated temporal replacement of the texture data, which is evaluated under image smoothness test. The creation of the candidate motion vector set and the image smoothness test may be repeated after moving the particular point further to the beginning of the motion partition in the video packet. A motion vector set with best smoothness measure may be selected to replace the corrupted motion vectors. Moreover, the selected motion vector set may be further processed in a reverse direction to recover some of the macroblocks that were estimated but are uncorrupted. Accordingly, present embodiments are configured such that the amount of decoded motion information is selected to maximize image smoothness.

Figure 1A:
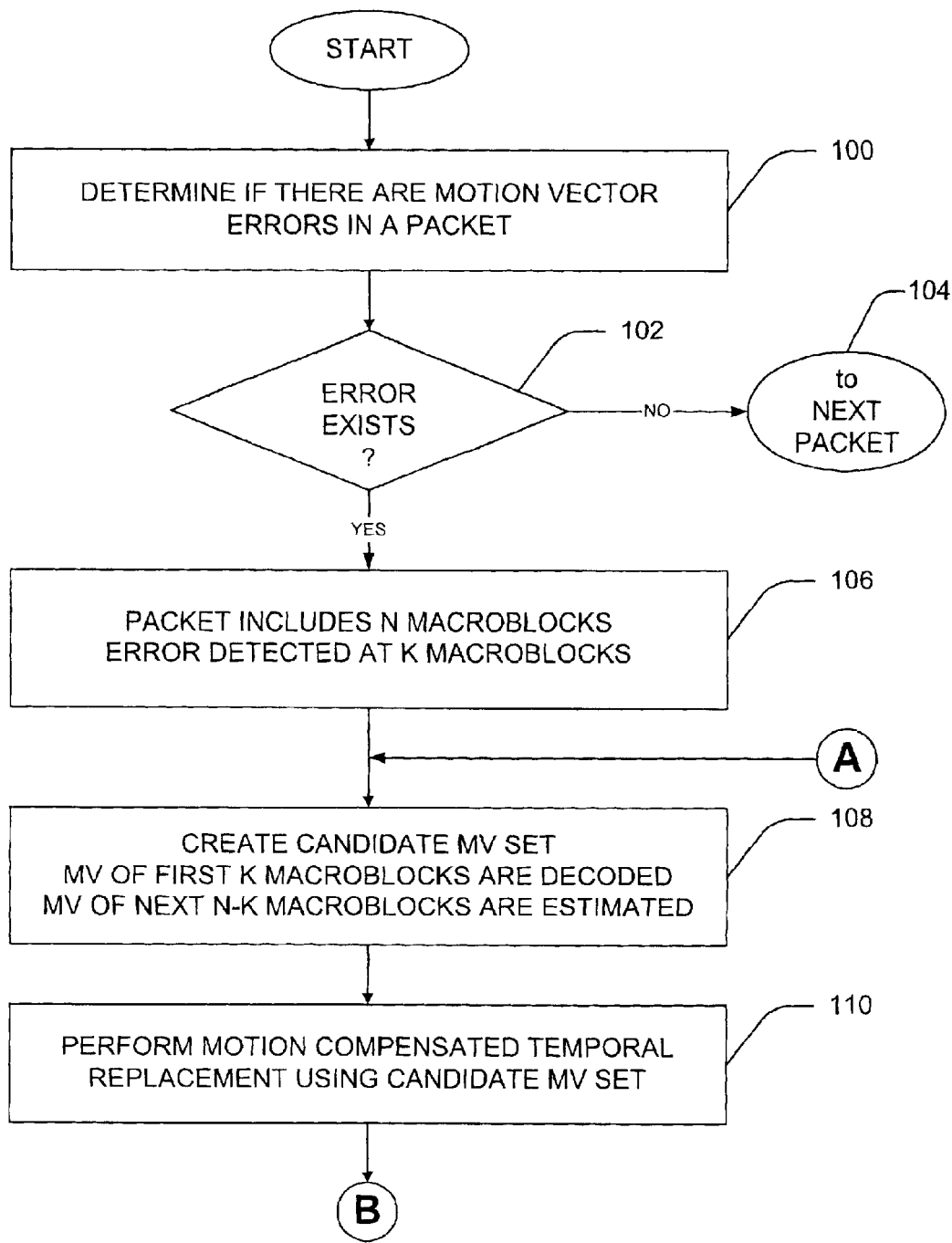
FIGS. 1A through 1C describe the present error concealment technique in accordance with an embodiment of the present invention.
Figure 1B:
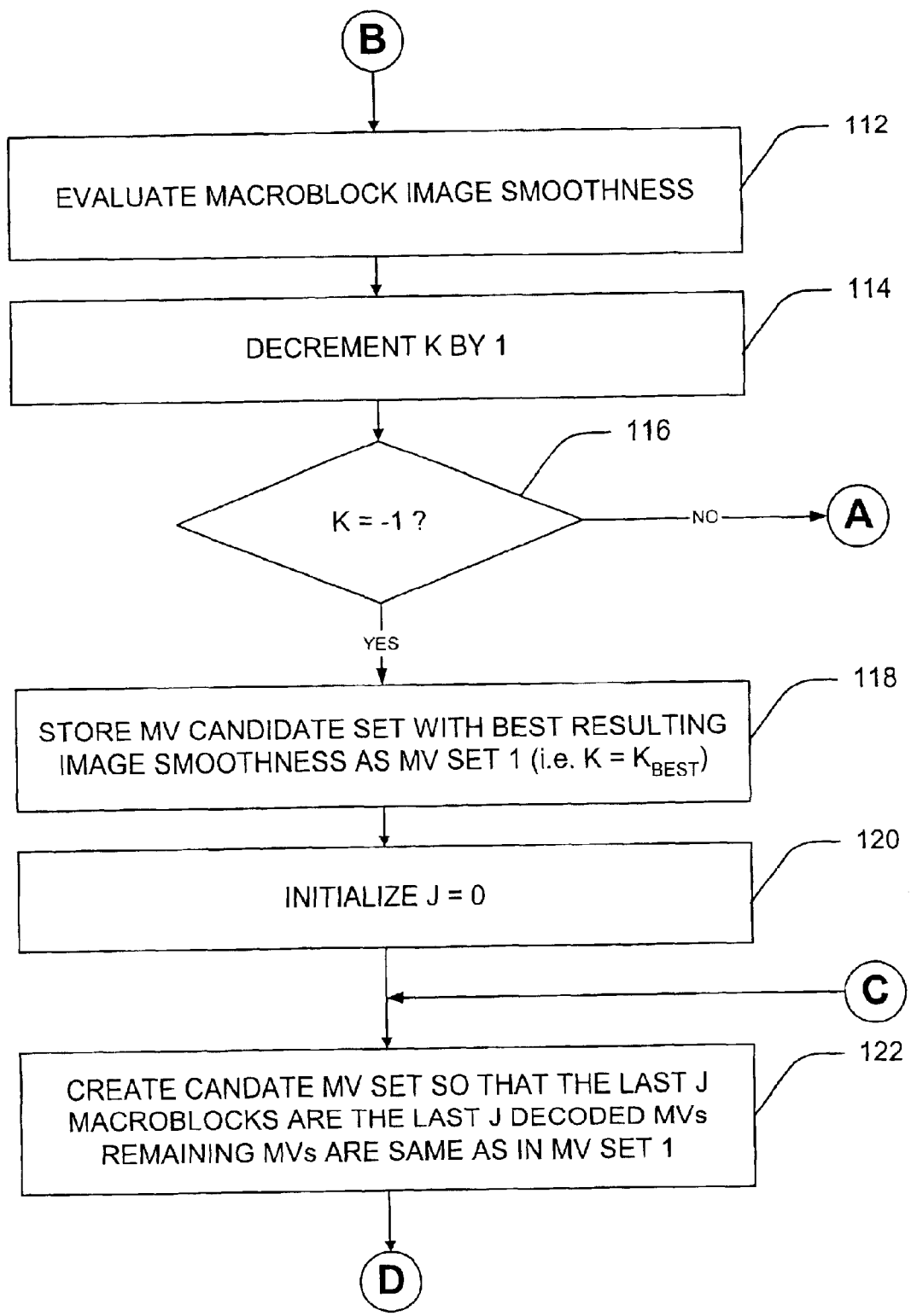
Figure 1C:
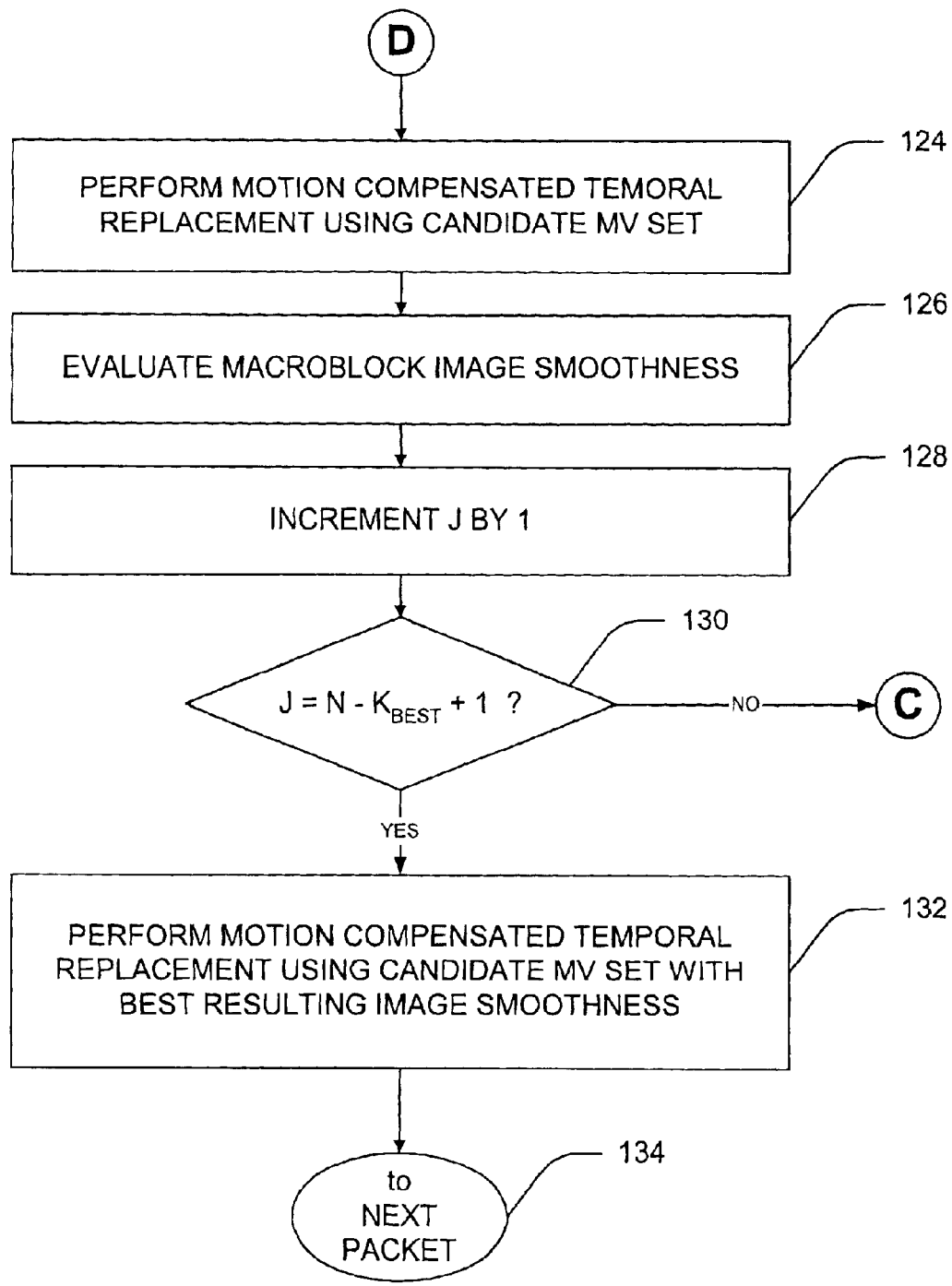

FIGS. 1A through 1C describe the present error concealment technique in accordance with an embodiment of the present invention. The technique is described in a flowchart form.

In the illustrated embodiment, determination is made (at 100) as to the presence of any motion vector errors in a video packet. Detecting invalid variable length code (VLC), inconsistent resynchronization header information, and/or receipt of out-of-range motion vectors and other related invalid codes may determine video packet errors. Since variable length codes are used to compress video data, the location where the decoder detects an error (e.g. where invalid VLC occur) may be some undetermined number of bits away from the actual location of the error. Furthermore, since motion information is also differentially encoded, errors in decoded motion information may persist after the location of bit error. Accordingly, if the error is detected at 102, then the video packet may be further processed at 106. Otherwise if no error is detected at 102, then the next video packet may be processed at 104.

Figure 2:
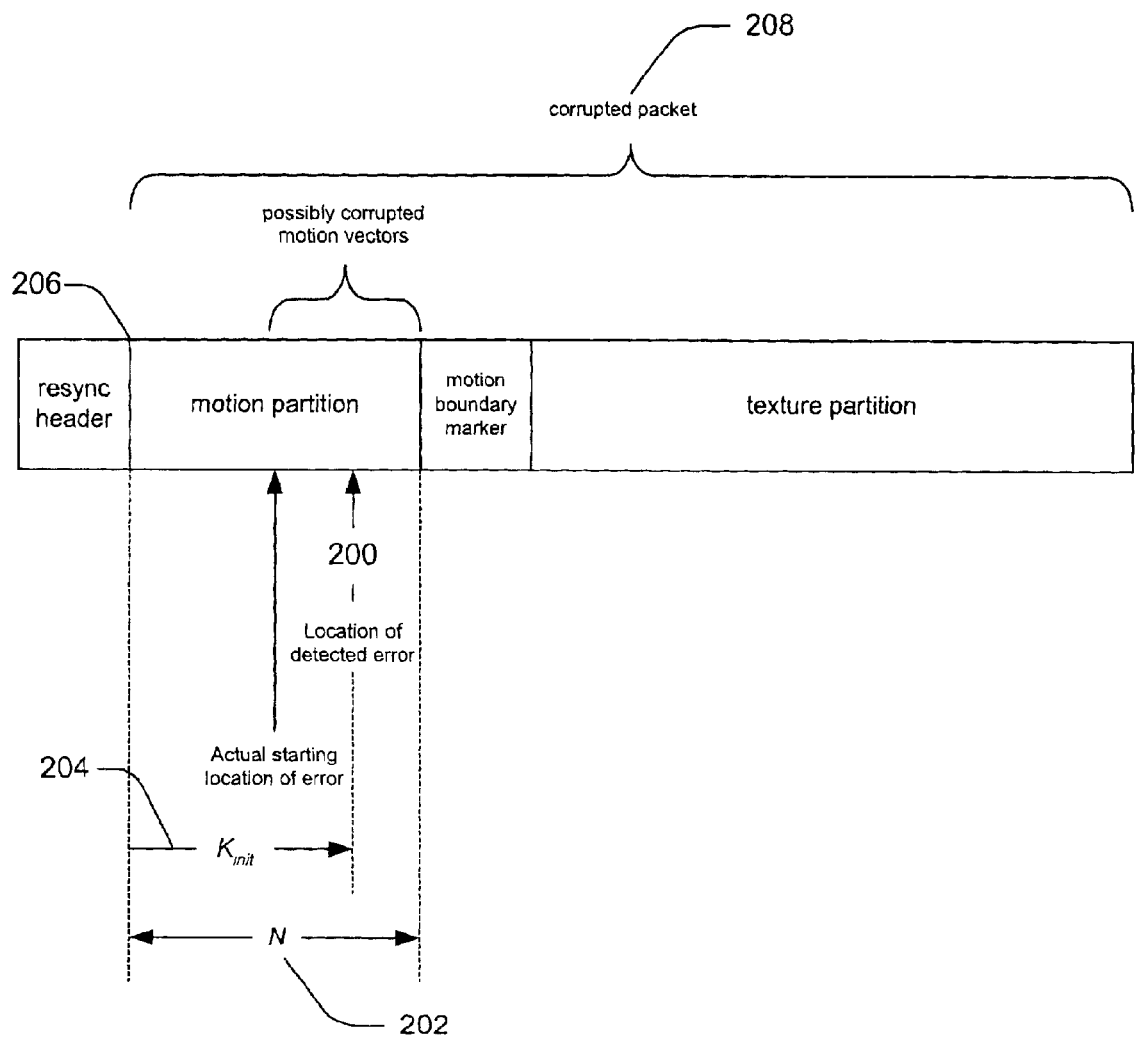
FIG. 2 shows an example of a corrupted video packet with relevant parameters designated on the packet.

In video data encoded in Moving Picture Experts Group (MPEG) format, a video frame is divided into macroblocks. In this format, each video packet includes information for consecutive macroblocks from left to right and top to bottom. The number of macroblocks (N) represented by each video packet may be determined by the change in macroblock number field of the video packet header. Thus, packet processing (at 106) may include determining the location of the detected error 200 with respect to the total number of macroblocks (N) 202. Further, the location determination may be made as occurring at a particular macroblock (K) 204 from the beginning of the motion partition 206. Therefore, an assumption may be made that motion information is corrupted starting from the location of the detected error 200. Accordingly, K is initially set to the number of macroblocks 204 decoded prior to the point of error detection and after start of current video packet. FIG. 2 shows an example of a corrupted video packet 208 with these parameters designated on the packet.

A candidate motion vector set is created, at 108. This candidate set includes N motion vectors, one for each macroblock of the current video packet. Initially, the first K motion vectors 204 are the decoded motion vectors of the corresponding first K macroblocks of the video packet. The remaining motion vectors (N−K) are estimated motion vectors. In one embodiment, motion vectors may be estimated by taking an average of motion vectors of "non-corrupted" neighboring macroblocks. In another embodiment, motion vectors may be estimated by taking a median of motion vectors of "non-corrupted" neighboring macroblocks. The first K macroblocks assumed to have non-corrupted motion information may be considered as "non-corrupted" in estimating the motion vectors of other macroblocks.

Using the candidate motion vector set from 108, motion compensated temporal replacement is performed at 110. The motion compensated temporal replacement process includes obtaining texture of each macroblock from the previous frame at motion compensated location using the candidate motion vector set. However, motion compensated temporal replacement is only required to be performed on macroblocks whose candidate motion vector has changed.

In the illustrated embodiment, the image smoothness of the corrupted video packet macroblocks restored by temporal replacement (at 110) may then be evaluated, at 112. The image smoothness may be measured by measuring the smoothness of macroblock boundaries in the restored texture data.

In one embodiment, this boundary smoothness is measured by summing the pixel value mismatch between macroblock boundary pixels. Thus, this method measures the image smoothness spatially (see FIG. 3). In another embodiment, the boundary smoothness is measured by summing the pixel value mismatch between the current frame and the motion compensated previous frame. Thus, this method measures the image smoothness temporally (see FIG. 4). These embodiments are described in detail below in conjunction with descriptions of FIGS. 3 and 4. In the illustrated embodiment, the evaluated candidate motion vector set is stored along with the mismatch value so that a motion vector set that produced a lowest mismatch value may be selected for later use. By storing the partial sum of the mismatch values for each macroblock, the sum of mismatch values in each iteration may be computed more efficiently by reusing the partial mismatch values from previous iteration for macroblocks whose motion vector and neighboring motion vector did not change.

At 114, the variable K is decremented by one, which moves the particular point of demarcation between the decoded and the estimated motion vectors further to the beginning of the motion partition in the video packet. If this particular point of demarcation has not reached the beginning of the motion partition 206 in the video packet (i.e. K≠−1) at 116, then the process of creating a candidate motion vector set and evaluating the image smoothness with one less decoded motion vector is repeated, at 108. Otherwise when K=−1, the motion vector candidate set includes only motion vectors that are estimated with no decoded motion vectors. Thus when K=−1, a motion vector set that produced a lowest mismatch value (i.e. best image smoothness and K=$K_{best}$) is selected and stored, at 118.

For this selected set, the first $K_{best}$ motion vectors are decoded motion vectors and the remaining N−$K_{best}$ motion vectors are estimated. Thus, even if there are some motion vectors after $K_{best}$ that were uncorrupted, these motion vectors use estimated vectors. Accordingly, the selected motion vector set may be further processed in a reverse direction to include these uncorrupted motion vectors. The reverse direction processing includes keeping the decoded motion vectors at the end of the motion partition.

The reverse direction processing includes initializing a variable J to zero, at 120. A candidate motion vector set is then created at 122. The candidate motion vector set includes same motion vectors as that of the motion vector set selected in 118, except for the last J motion vectors. In the selected motion vector set (selected in 118), the last J motion vectors are estimated motion vectors. However, in the illustrated embodiment, these last J motion vectors in the candidate motion vector set are replaced with the decoded motion vectors.

Using the candidate motion vector set created at 122, motion compensated temporal replacement is performed at 124, similar to the replacement processing at 110. The motion compensated temporal replacement process includes obtaining texture of each macroblock from the previous frame at motion compensated location using the candidate motion vector set.

Again, the image smoothness of the corrupted video packet macroblocks restored by temporal replacement (at 124) is evaluated at 126. The same evaluation techniques as those used in 112 may be used to evaluate the image smoothness at 126. The image smoothness may be measured by measuring the smoothness of macroblock boundaries in the restored texture data using boundary pixel mismatch values.

At 128, the variable J is incremented by one, which adds one more decoded vector at the end. If the decoded macroblock has not reached the $K_{best}$ point (i.e. J≠N−$K_{best}$+1) at 130, then the process of creating a candidate motion vector set and evaluating the image smoothness with one more decoded motion vector at the end is repeated, at 122. Otherwise when the decoded macroblock has reached the $K_{best}$ point (i.e. J=N−$K_{best}$+1), a motion vector set that produced a lowest mismatch value (i.e. best image smoothness and J=$J_{best}$) is selected, at 132. Thus, the last $J_{best}$ decoded motion vectors are considered for replacing the estimated motion vectors. Finally, the processing moves to the next video packet, at 134.

Figure 3:
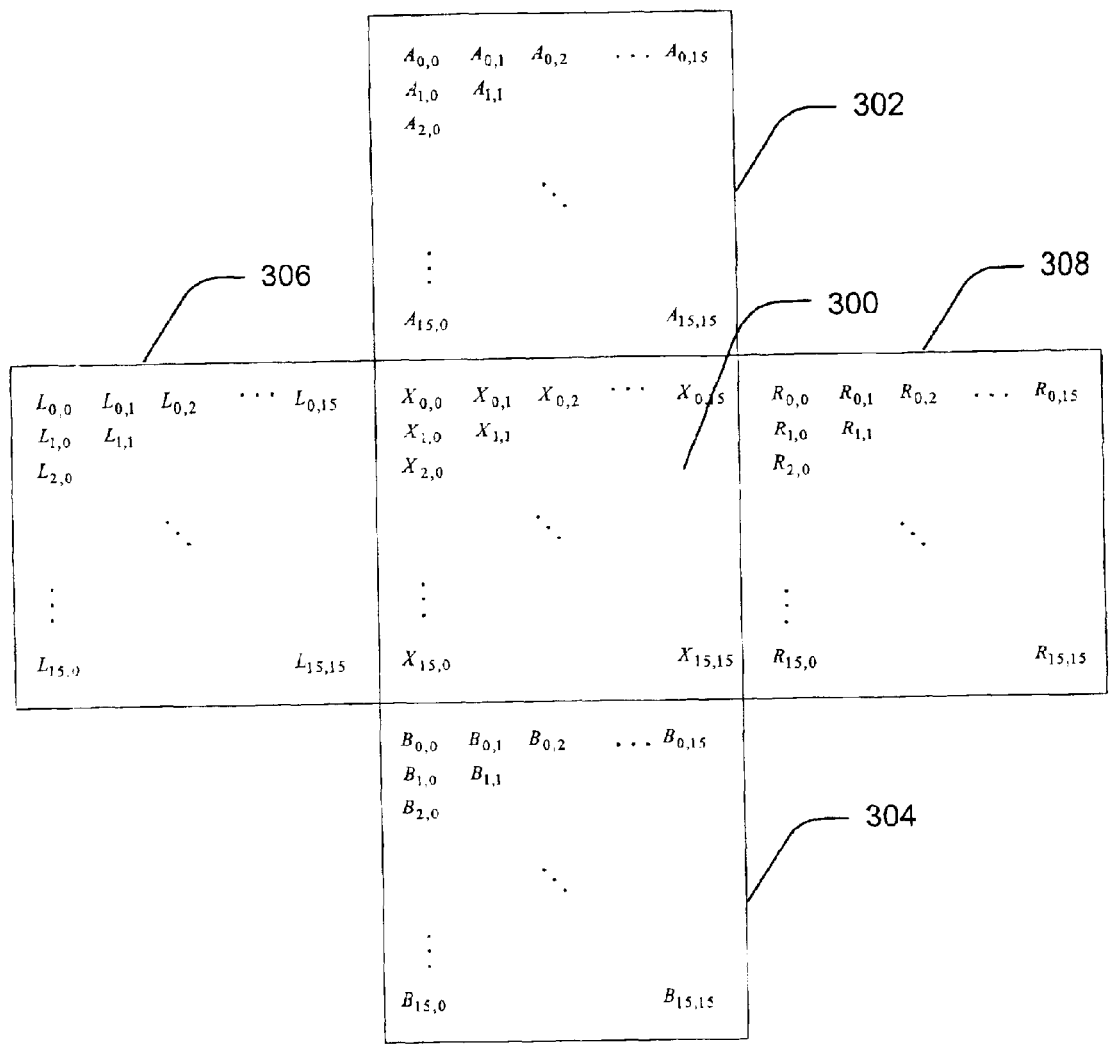
FIG. 3 illustrates an image smoothness test of texture data in accordance with an embodiment of the present invention.

FIG. 3 illustrates an image smoothness test of texture data in accordance with an embodiment of the present invention. The image smoothness of the current macroblock 300 may be evaluated by summing the square of the pixel value mismatch between the current macroblock 300 and the neighboring macroblock 302, 304, 306, 308 boundary pixels. In the illustrated embodiment, the boundary pixel mismatch value ($\mu 1$) of the current macroblock 300 is computed as:

$$\mu 1 = \sum_{i=0}^{15} (X_{0,i} - A_{15,i})^2 + (X_{15,i} - B_{0,i})^2 + (X_{i,0} - L_{i,15})^2 + (X_{i,15} - R_{i,0})^2.$$

However, other methods, such as root-sum-square or simple difference sum, may be employed to compute the boundary pixel mismatch value. Further, the image smoothness test may be performed with more than one row or column difference of the boundary pixels between neighboring macroblocks.

Figure 4:
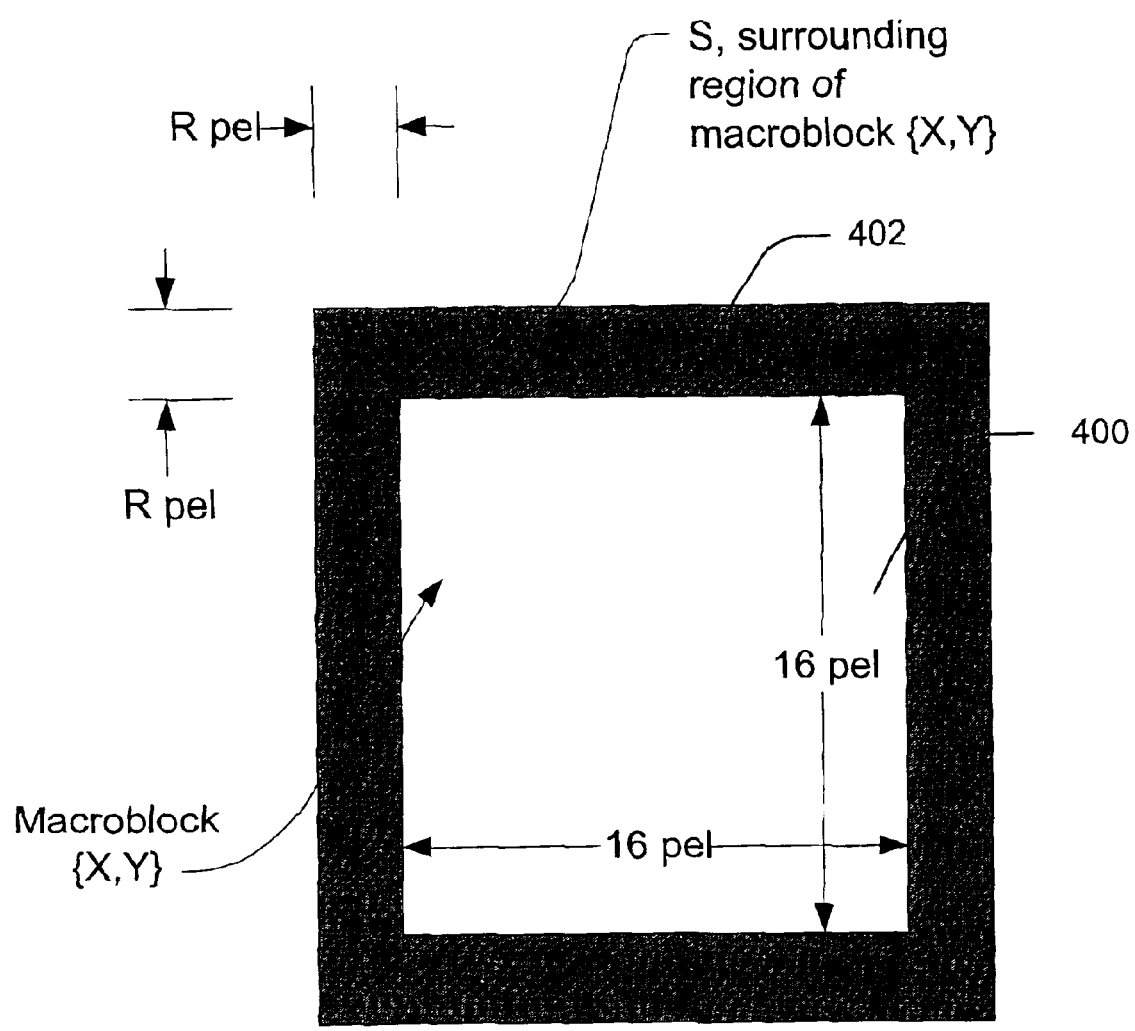
FIG. 4 illustrates an image smoothness test of texture data in accordance with an alternative embodiment of the present invention.

FIG. 4 illustrates an image smoothness test of texture data in accordance with an alternative embodiment of the present invention. The image smoothness of the current macroblock {X, Y} 400 is evaluated by summing the square of the pixel mismatch value ($\mu 2$) between the surrounding region 402 of the current macroblock 400 and the motion compensated temporal replacement (from the previous frame) of the surrounding region 402. The surrounding pixel mismatch value for the current macroblock 400 is computed as:

$$\mu 2 = \sum_{x,y \subset S} \sum (P_{16X+x,16Y+y} - P'_{16X+x+dx,16Y+y+dy})^2,$$

where {X, Y} is macroblock coordinates (origin at top left corner); $P_{x,y}$ is the pixel value of the current frame at pixel coordinates {x,y}; $P'_{x,y}$ is the pixel value of the previous frame at pixel coordinates {x,y}; and {dx, dy} is the motion vector used for temporal replacement of the current macroblock at {X, Y}. Therefore, $P_{16X+x,16Y+y}=P'_{16X+x+dx,16Y+y+dy}$ for $0 \leq x \leq 15$ and $0 \leq y \leq 15$. S is the region of pixels surrounding macroblock {X, Y} as shown in FIG. 4. Value of R may be variable. However, a value of R=8 may work well.

Figure 5:
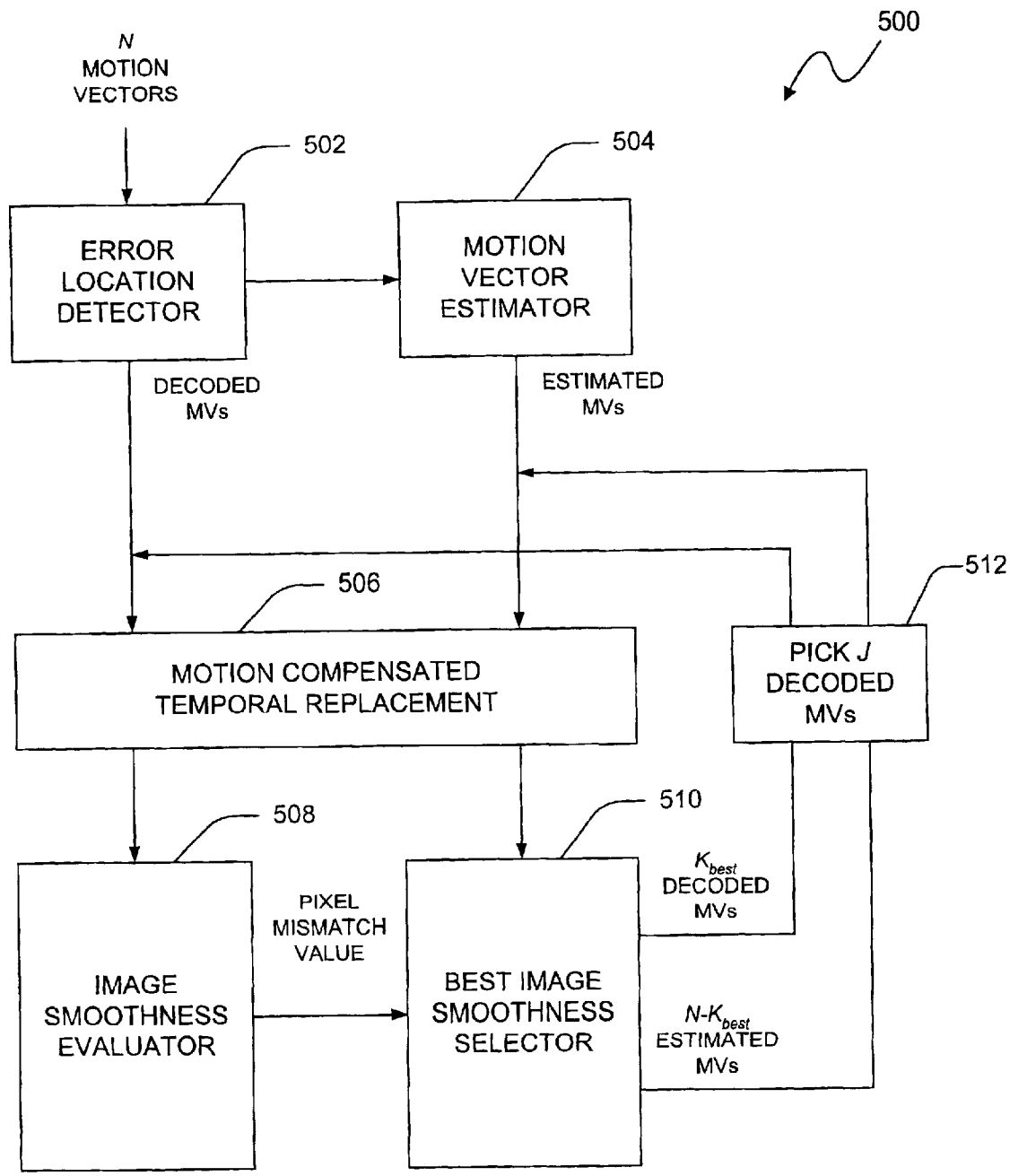
FIG. 5 shows an error concealment system according to an embodiment of the present invention.

An error concealment system 500 according to an embodiment of the present invention is shown in FIG. 5. The system 500 includes an error location detector 502 to receive N motion vectors, some of which are corrupted. In the illustrated embodiment, the detector 502 is configured to determine the location of a video packet error with respect to the total number of macroblocks (N). The location determination provides the macroblock number (K) from the beginning of the motion partition. Thus, this determination enables separation of N motion vectors into K decoded motion vectors and N−K estimated motion vectors.

The last N−K motion vectors may be estimated by a motion vector estimator 504. In one embodiment, the estimator 504 includes an averaging element to estimate the motion vectors by taking an average of motion vectors of "non-corrupted" neighboring macroblocks. In another embodiment, the estimator 504 includes a median calculator to estimate the motion vectors by computing a median of motion vectors of "non-corrupted" neighboring macroblocks. The K macroblocks assumed to have non-corrupted motion information may be considered as "non-corrupted" in estimating the motion vectors of other macroblocks. The K decoded motion vectors and N−K estimated motion vectors are then sent to a motion compensated temporal replacement element 506. The temporal replacement element 506 performs motion compensated temporal replacement of the texture data from the previous frame using the received motion vectors.

An image smoothness evaluator 508 then evaluates the image smoothness of the temporally replaced texture data. In the illustrated embodiment, the evaluator 508 measures the smoothness of macroblock boundaries in the restored texture data. Particular implementations of the macroblock boundary test have been described above.

A best image smoothness selector 510 receives a series of pixel mismatch values from the evaluator 508, and selects a set of motion vectors that provides best image smoothness. This set of motion vectors includes $K_{best}$ decoded motion vectors and N−$K_{best}$ estimated motion vectors. This first set of motion vectors may be further processed to reclaim some of the estimated motion vectors that may be uncorrupted. Thus, block 512 is configured to select J decoded motion vectors at the end of the motion partition to replace some of the estimated motion vectors in the first set. The second set of motion vectors that includes J decoded motion vectors at the end of the motion partition may be processed through the motion compensated temporal replacement element 506, the image smoothness evaluator 508, and the best image smoothness selector 510, for the second time.

There has been disclosed herein embodiments for error concealment of video data using bi-directional motion vector data recover. In concealing video packets with corrupted motion partition, the decoder attempts to utilize uncorrupted received motion information.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. For example, the use of motion vectors with respect to macroblocks are for illustrative purposes only. The motion vectors may be defined for groups other than macroblocks. In other instances, well-known structures and functions were not described in elaborate detail in order to avoid obscuring the subject matter of the present invention. Accordingly, the scope and spirit of the invention should be judged in terms of the claims which follow.

What is claimed is:

1. A method for concealing errors in video data, comprising:

decoding a first set of motion vectors in a corrupted video packet;

estimating a second set of remaining motion vectors in the corrupted video packet;

performing motion compensated temporal replacement of texture data using said first and second sets of motion vectors;

evaluating image smoothness of the texture data;

repeating said decoding, estimating, performing, and evaluating with one less motion vector in the first set and one more motion vector in the second set, said repeating done until there is no more motion vector left in the first set; and selecting sets of motion vectors from said first and second sets to replace motion vectors in said corrupted video packet, where said sets of motion vectors produce a best image smoothness measure of said texture data.

2. The method of claim 1, further comprising:

determining presence of motion vector errors in the corrupted video packet.

3. The method of claim 2, wherein the presence of motion vector errors is detected by monitoring invalid variable length code.

4. The method of claim 1, wherein the first and second sets of motion vectors are motion vectors for macroblocks in the video packet.

5. The method of claim 4, wherein initially the first set of motion vectors includes motion vectors for macroblocks prior to a location of detected error, and the second set of motion vectors includes motion vectors for macroblocks subsequent to the location of detected error.

6. The method of claim 1, wherein said estimating the second set includes taking an average of motion vectors of non-corrupted neighboring macroblocks.

7. The method of claim 1, wherein said estimating the second set includes taking a median of motion vectors of non-corrupted neighboring macroblocks.

8. The method of claim 1, wherein said performing motion compensated temporal replacement includes restoring texture data of macroblocks by propagating texture data from a previous frame using said first and second sets of motion vectors.

9. The method of claim 1, wherein said evaluating image smoothness includes measuring smoothness of macroblock boundaries in the restored texture data.

10. The method of claim 9, wherein said measuring smoothness of macroblock boundaries includes measuring the image smoothness spatially.

11. The method of claim 10, wherein said measuring includes summing pixel value mismatch between macroblock boundary pixels.

12. The method of claim 11, wherein said best image smoothness measure provides a lowest pixel value mismatch of the macroblock boundary pixels.

13. The method of claim 9, wherein said measuring smoothness of macroblock boundaries includes measuring the image smoothness temporally.

14. The method of claim 13, wherein said measuring includes summing pixel value mismatch of surrounding area between a current frame and a motion compensated previous frame.

15. The method of claim 14, wherein said best image smoothness measure provides a lowest pixel value mismatch of surrounding area between a current frame and a motion compensated previous frame.

16. The method of claim 1, further comprising:

processing said selected first and second sets of motion vectors in a reverse direction.

17. The method of claim 16, wherein said processing includes replacing some of the second set of estimated motion vectors with decoded motion vectors.

18. The method of claim 17, wherein said replacing includes creating a candidate motion vector set by combining said first set of motion vectors with said second set of motion vectors, where an estimated motion vector at the end of said second set of motion vectors is replaced with a decode motion vector.

19. The method of claim 18, further comprising:

performing motion compensated temporal replacement of texture data using said candidate motion vector set.

20. The method of claim 19, further comprising:

evaluating an image smoothness of the motion compensated texture data.

21. The method of claim 20, further comprising:

repeating said creating, performing, and evaluating with one more decoded motion vector replacing the estimated motion vector.

22. The method of claim 21, wherein said repeating is done until all the motion vectors in the second set is replaced with decoded motion vectors.

23. The method of claim 22, further comprising:

selecting a set of motion vectors that provides best image smoothness, where said set of motion vectors are used to replace the motion vectors in the corrupted video packet.

24. A method for concealing errors in video data, comprising:

creating a first set of motion vectors having decoded motion vectors prior to a location of error and estimated motion vectors subsequent to the location of error;

performing motion compensated temporal replacement of texture data using said first set of motion vectors;

evaluating image smoothness of the texture data;

repeating said creating, performing, and evaluating with one less decoded motion vector and one more estimated motion vector, to generate a plurality of said first set of motion vectors, said repeating done until there is no more decoded motion vector left; and selecting a best set of motion vectors from said plurality of said first set of motion vectors to replace corrupted motion vectors in said video packet, where said best set of motion vectors produce a best image smoothness measure of said texture data.

25. An error concealment system, comprising:

an error location detector to determine location of video packet error;

a motion vector estimator to estimate motion vectors;

a motion compensated temporal replacement element arranged to receive a first set of motion vectors including decoded motion vectors and estimated motion vectors, said replacement element operating to perform motion compensated temporal replacement of texture data using said decoded and estimated motion vectors;

an image smoothness evaluator to evaluate smoothness of a series of replaced texture data; and a best smoothness selector to select a set of motion vectors that produces best image smoothness, wherein at least said motion compensated temporal replacement element, said image smoothness evaluator and said best smoothness selector repeating operations of (i) performing motion compensated temporal replacement of texture data using said decoded and estimated motion vectors and (ii) evaluating smoothness of said series of replaced texture data with one less decoded motion vector and one more estimated motion vector in said first set of motion vectors to generate a second set of motion vectors until there are no more decoded motion vectors left in said second set of motion vectors, and then, said best smoothness selector selecting said best set of motion vectors from said second set of motion vectors to replace corrupted motion vectors in a video packet associated with said video packet error.

26. The system of claim 25, further comprising:
an error detector to detect presence of motion vector errors in a corrupted video packet.

27. The system of claim 26, wherein the presence of motion vector errors is detected by monitoring invalid variable length code.

28. The system of claim 25, wherein said motion vector estimator includes an averaging element to average motion vectors of non-corrupted neighboring macroblocks.

29. The system of claim 25, wherein said motion vector estimator includes a median calculator to compute a median of motion vectors of non-corrupted neighboring macroblocks.

30. The system of claim 25, wherein said motion vector estimator initially estimates motion vectors for macroblocks subsequent to the location of detected error.

31. The system of claim 25, wherein said motion compensated temporal replacement element initially decodes motion vectors for macroblocks prior to the location of detected error.

32. The system of claim 25, wherein said image smoothness evaluator includes an accumulator and a differencing element to sum pixel value mismatch between macroblock boundary pixels.

33. The system of claim 25, further comprising:
a selector to select a set of motion vectors that provides best image smoothness.

* * * * *